(12) United States Patent
Karng et al.

(10) Patent No.: US 12,460,829 B2
(45) Date of Patent: Nov. 4, 2025

(54) BUILDING SYSTEM FOR REDUCING ENERGY CONSUMPTION

(71) Applicant: KOREA INSTITUTE OF SCIENCE AND TECHNOLOGY, Seoul (KR)

(72) Inventors: Sarng Woo Karng, Seoul (KR); You Hwan Shin, Seoul (KR); Myeong Seon Chae, Seoul (KR); Hyun Ji Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 535 days.

(21) Appl. No.: 17/486,620

(22) Filed: Sep. 27, 2021

(65) Prior Publication Data

US 2022/0341605 A1 Oct. 27, 2022

(30) Foreign Application Priority Data

Apr. 23, 2021 (KR) .................. 10-2021-0053144

(51) Int. Cl.
*F24S 20/66* (2018.01)
*F24D 11/00* (2022.01)
(Continued)

(52) U.S. Cl.
CPC .......... *F24F 5/0021* (2013.01); *F24F 5/0046* (2013.01); *F24F 2005/0064* (2013.01)

(58) Field of Classification Search
CPC .. F24D 11/003; F24D 11/007; F24D 11/0221; F24D 11/0264; F24D 19/1078; F24D 2200/10; F24D 2200/12; F24D 2200/123; F24D 2200/14; F24F 2005/0025; F24F 2005/0064; F24F 2005/0082; F24F 5/0021; F24F 5/0075; F24F 5/0089; F24S 20/66; F24S 20/0034; F28D 20/023; F28D 2020/0021

See application file for complete search history.

(56) References Cited

U.S. PATENT DOCUMENTS 10,697,174 B1 * 6/2020 Bomberg ............... B32B 5/26
2005/0055982 A1 * 3/2005 Medina ................. E04B 1/80
52/506.01

(Continued)

FOREIGN PATENT DOCUMENTS

KR 200446158 Y1 10/2009
KR 1020170084419 A 7/2017

(Continued)

OTHER PUBLICATIONS

Korean Office Action in the counterpart Korean application No. 10-2021-0053144 dated Mar. 7, 2022.

*Primary Examiner* — Frantz F Jules
*Assistant Examiner* — Jason N Thompson
(74) *Attorney, Agent, or Firm* — Rabin & Berdo, P.C.

(57) ABSTRACT

Disclosed is a building system for reducing energy consumption. The building system includes an exterior wall layer disposed on an exterior wall of building walls, a circulation pipe disposed inside the exterior wall layer and through which a heating medium for absorbing heat caused by solar radiant energy applied to the exterior wall layer flows, and a thermal energy storage connected to the circulation pipe and configured to store the heat transmitted by the heating medium.

6 Claims, 4 Drawing Sheets

(51) Int. Cl.
*F24D 11/02* (2006.01)
*F24D 19/10* (2006.01)
*F24F 5/00* (2006.01)

(56) References Cited

U.S. PATENT DOCUMENTS

| | | | | |
|---|---|---|---|---|
| 2010/0198414 | A1* | 8/2010 | Kroll | F24D 3/14 |
| | | | | 165/56 |
| 2012/0227926 | A1* | 9/2012 | Field | F24S 10/95 |
| | | | | 165/157 |
| 2015/0292810 | A1* | 10/2015 | Pilebro | F28D 20/0034 |
| | | | | 165/10 |
| 2017/0030656 | A1* | 2/2017 | Lien | F28D 20/021 |
| 2017/0254601 | A1* | 9/2017 | Sutterlin | F24D 19/1042 |
| 2019/0162451 | A1* | 5/2019 | Wallace | F24S 10/742 |
| 2020/0408471 | A1* | 12/2020 | Zhang | E04B 1/7608 |

FOREIGN PATENT DOCUMENTS

| | | |
|---|---|---|
| KR | 1020190030843 A | 3/2019 |
| KR | 20200141577 A | 12/2020 |

\* cited by examiner

BUILDING SYSTEM FOR REDUCING ENERGY CONSUMPTION

CROSS-REFERENCE TO RELATED APPLICATION

This application claims priority to and the benefit of Korean Patent Application No. 2021-0053144, filed on Apr. 23, 2021, the disclosure of which is incorporated herein by reference in its entirety.

BACKGROUND

1. Field of the Invention

The present invention relates to a building system for reducing energy consumption, and more particularly, to a building system for reducing energy consumption which, in a building such as a house, a commercial building, or the like, absorbs solar energy applied to an exterior wall of the building in summer season to minimize transmission of the solar energy into the building, thereby reducing cooling energy consumption in the building.

2. Discussion of Related Art

The purpose of insulating buildings is to maintain an interior of the building at a comfortable temperature by blocking the warmth in summer season and the chill in winter season. However, even when the outdoor air is blocked through insulation and an indoor temperature is maintained in a comfortable condition, a sensory temperature actually felt by people living in the building may be different. The feeling of a person feeling hot or cold is not simply due to the indoor temperature of the building but is due to a result of a complex action of radiant heat, airflow, or the like.

An important factor that determines an indoor environment of a building together with insulation is heat capacity of the building that determines radiant heat or airflow. The large heat capacity of a building means that the building may absorb and store a lot of heat, which means that the sudden rise or fall of an indoor temperature may be slowed down even when there is a temperature difference with the outside air or a heat source for heating and cooling work.

Therefore, when building materials in which temperature, radiant heat, and airflow are properly harmonized in order to maintain such a pleasant indoor environment of the building are intended to be realized, conflicting problems occur. Particularly, there is a problem in that, in countries with four distinct seasons, the use of energy rapidly increases in summer season due to rapid changes in indoor temperature through a building wall due to the sweltering heat.

DOCUMENT OF RELATED ART

Patent Document

Korean Laid-open Patent Publication No. 2019-0030843 (Published on Mar. 25, 2019)

SUMMARY OF THE INVENTION

The present invention is directed to providing a building system for reducing energy consumption, in which solar radiant energy applied to an exterior wall of a building is absorbed using a heating medium that circulates through a circulation pipe so that thermal energy transmitted to an interior of the building is minimized, thereby reducing cooling energy consumption.

The present invention is also directed to providing a building system for reducing energy consumption, in which an exterior wall layer in which a phase change material (PCM) is accommodated is provided in an exterior wall of a building and a circulation pipe is disposed inside the exterior wall layer, thereby absorbing heat by a heating medium while preventing heat from penetrating into the building.

The present invention is also directed to providing a building system for reducing energy consumption, in which energy absorbed in a heating medium in a circulation pipe is stored in a seasonal thermal energy storage and the energy stored in the seasonal thermal energy storage is used for heating when there is a demand for heating, thereby reducing heating energy consumption in the building.

According to an aspect of the present invention, there is provided a building system for reducing energy consumption that, includes an exterior wall layer disposed on an exterior wall of building, a circulation pipe which is disposed inside the exterior wall layer and through which a heating medium for absorbing heat caused by solar radiant energy applied to the exterior wall layer flows, and a thermal energy storage connected to the circulation pipe and configured to store heat transmitted by the heating medium.

The thermal energy storage may be a seasonal thermal energy storage.

A PCM may be accommodated in the exterior wall layer and the heating medium may absorb heat stored in the PCM through heat exchange.

As the PCM, a PCM having a phase change temperature of 22° C. to 30° C. may be used.

The PCM may be any one of coconut oil, paraffin, and n-octadecane.

The building system may further include an energy demand unit configured to perform heating using the heat stored in the thermal energy storage, the thermal energy storage being connected to a hot water pipe and, wherein the energy demand unit may include at least one of an indoor heating unit which heats a floor surface or air inside the building, an interior wall heating unit which heats an interior wall of the building, a ventilation heating unit which heats outdoor air introduced into the building and a hot water supply unit which heats water to supply a hot water, and a ventilation heating unit which heats outdoor air introduced into the building, and the hot water pipe may pass through the energy demand unit to provide the heat.

The interior wall heating unit may be formed as a heat radiation layer that forms an interior wall inside an insulator of the building wall and has an interior through which the hot water pipe passes.

The heating medium may include water, the thermal energy storage may include a tank for storing heat in a form of storing the water heated while being circulated in the exterior wall layer, a control valve configured to control a flow direction of the water may be provided in the circulation pipe disposed between the thermal energy storage and the exterior wall layer, the hot water pipe may be connected to the control valve so that the water discharged from the thermal energy storage flows to the circulation pipe or the hot water pipe by controlling the flow direction of the water by the control valve, and a circulation pump may be installed between the thermal energy storage and the control valve.

A heat pump configured to increase a temperature of the water flowing through the hot water pipe may be installed in the hot water pipe.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

While the present invention is susceptible to various modifications and alternative forms, specific embodiments thereof are shown by way of example in the accompanying drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention. Like numbers refer to like elements throughout the description of the figures.

Terms are only used to distinguish one element from another element. The terms used herein are for the purpose of describing specific embodiments only and are not intended to be limiting to the present invention. As used herein, the singular forms "a" and "an" are intended to include the plural forms as well, unless the context clearly indicates otherwise.

Hereinafter, the embodiments of the present invention will be described in detail with reference to the accompanying drawings.

Figure 1:
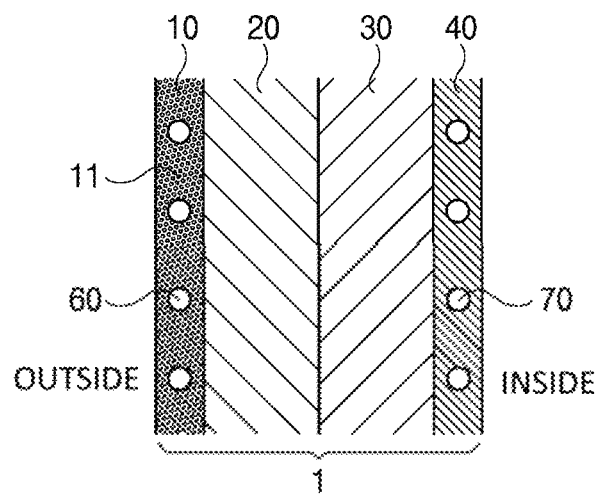
FIG. 1 is a cross-sectional view illustrating a structure of a building wall to which a building system for reducing energy consumption according to the present invention is applied.
Figure 2:
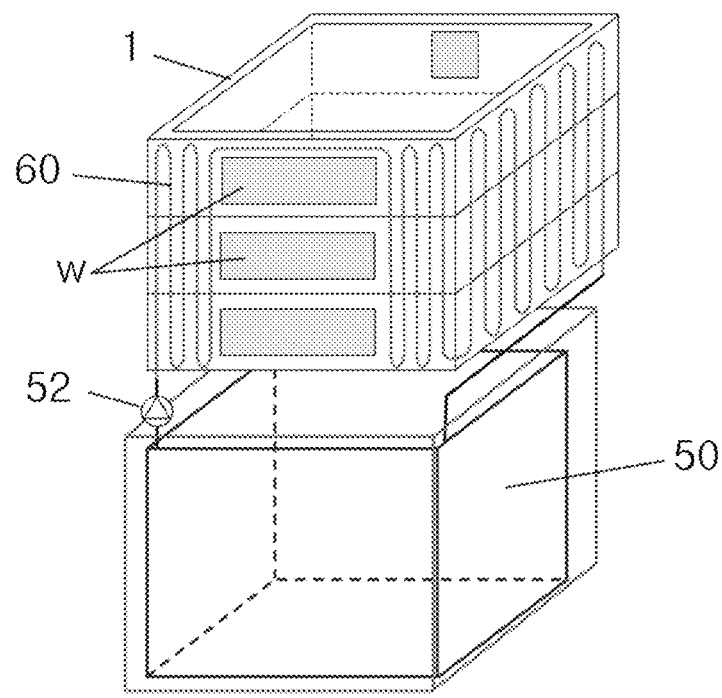
FIG. 2 is a view illustrating a flow of a heating medium of the building system for reducing energy consumption according to the present invention.
Figure 3:
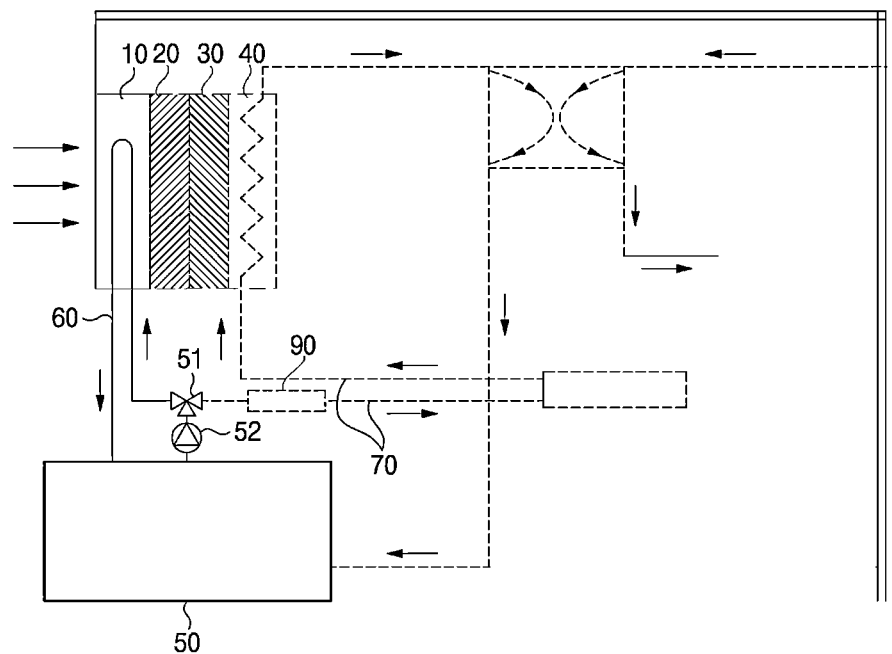
FIG. 3 is a schematic configuration diagram illustrating a configuration of the building system for reducing energy consumption according to the present invention and an operating state of the building system in summer season.
Figure 4:
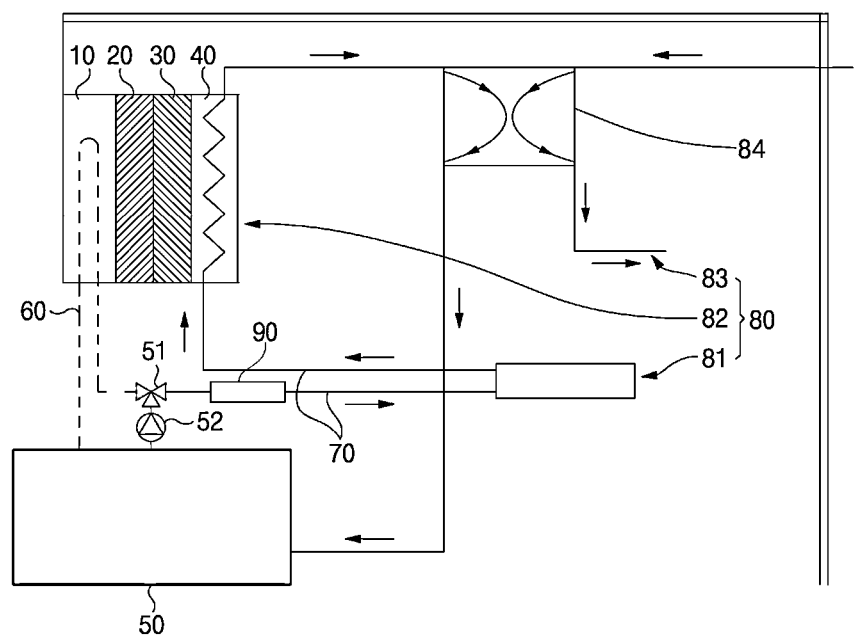
FIG. 4 is a schematic configuration diagram illustrating an operating state of the building system for reducing energy consumption according to the present invention in winter season.

FIG. 1 is a cross-sectional view illustrating a structure of a building wall to which a building system for reducing energy consumption according to the present invention is applied, FIG. 2 is a view illustrating a flow of a heating medium of the building system for reducing energy consumption according to the present invention, and FIGS. 3 and 4 are schematic configuration diagrams illustrating a configuration of the building system for reducing energy consumption according to the present invention and operating states of the building system in summer season and winter season.

The building system for reducing energy consumption according to the present invention includes an exterior wall layer 10 provided on an outer side of a building, a circulation pipe 60 provided inside the exterior wall layer 10, and a thermal energy storage. The thermal energy storage may be a seasonal thermal energy storage 50.

According to the present invention, the thermal energy storage for storing heat is not limited to the seasonal thermal energy storage 50 and may be a daily thermal energy storage in a way that thermal energy stored during the day may be consumed in the evening. In regions where there is little need to reduce building energy consumption by using thermal energy stored in summer season in winter season, such as in desert climate regions, it is advantageous that the thermal energy storage is a daily thermal energy storage in a way that thermal energy stored during the day can be consumed in the evening. However, it is advantageous that the thermal energy storage is a seasonal thermal energy storage in climate regions in which the change of seasons is clear so that energy consumption for cooling is large in summer season and energy consumption for heating in winter season is large. The daily thermal energy storage and the seasonal thermal energy storage are divided according to thermal energy storage and thermal energy radiation cycles, and known daily thermal energy storages and seasonal thermal energy storages may be applied. Hereinafter, an embodiment of the present invention will be described in detail with an example in which the thermal energy storage is the seasonal thermal energy storage 50.

Referring to FIG. 1, generally, a building wall 1 includes a concrete layer 20 and an insulator 30. The building system for reducing energy consumption according to the present invention includes the exterior wall layer 10 fixed to an exterior wall of the building like the concrete layer 20. Further, the building system includes a heat radiation layer 40 fixed to an interior wall, such as the insulator 30, of the building.

The building wall 1, to which the building system for reducing energy consumption according to the present invention is applied, may include the exterior wall layer 10, the concrete layer 20, the insulator 30, and the heat radiation layer 40 sequentially inward from the outer side of the building.

The exterior wall layer 10 is located on an outer side of the building like the concrete layer 20 but does not necessarily form the outermost layer of the building wall 1. An additional layer may be formed on an outer side of the exterior wall layer 10 for an exterior facade of the building or the like.

As components of the building wall 1, the concrete layer 20 and the insulator 30 are formed of materials generally used when the building wall 1 is constructed, as known components. The concrete layer 20 generally serves to partition an indoor space and is usually used as an exterior wall. The insulator 30 is bonded to the concrete layer 20 and may be made of a material such as polystyrene-based foam, urethane foam, perlite, urea foam, or the like as a known component. There are various structures and materials for the insulator 30, and the present invention is not limited to the insulator 30 having a specific structure or material.

According to the embodiment of the present invention, the circulation pipe 60 through which a heating medium circulates is disposed in the exterior wall layer 10. As illustrated in FIG. 2, the circulation pipe 60 has a large heat exchange area in the interior of the exterior wall layer 10 in a combination of a straight shape and a U shape. The heating medium circulates in an interior of the circulation pipe 60 and absorbs heat arising from solar radiant energy incident on the exterior wall layer 10. The heating medium absorbing the heat moves to the seasonal thermal energy storage 50 and serves to store the heat in the seasonal thermal energy storage 50.

As illustrated in FIG. 2, the exterior wall layer 10 may be formed to cover an entirety of the building wall 1 except for portions, in which windows w or doors are formed, of the building wall 1. Therefore, the heating medium inside the circulation pipe 60 may effectively absorb the heat introduced into the building from the building wall 1 and provide the heat to the seasonal thermal energy storage 50.

Since the circulation pipe 60 of the exterior wall layer 10 absorbs the heat introduced into the building from the building wall 1 and blocks the heat from being absorbed into the building, the exterior wall layer 10 functions as a thermal barrier layer that blocks the heat from being absorbed into the building in summer season or during a heat wave, that is, an insulating layer.

According to the embodiment of the present invention, as illustrated in FIG. 1, the interior of the exterior wall layer 10 is filled with a phase change material (PCM) 11.

The PCM 11 is a material that absorbs heat when a state of the material is changed from a solid state to a liquid state as an ambient temperature is changed, stores the heat thereinside, and discharges the stored heat when the state of the material is changed from the liquid state to the solid state. The PCM 11 may absorb and store heat in a solid state, and when a state of the PCM 11 is changed from the solid state to a liquid state, the PCM 11 absorbs the heat without a change in temperature. A temperature at which a phase change occurs as the heat enters and exits without a change in temperature in this way is referred to as a latent heat section. When a phase is changed from a solid state to a liquid state, the PCM 11 absorbs the heat in a latent heat section without a change in temperature, and thus the temperature may be maintained in a phase change temperature section, that is, the latent heat section.

The PCM 11 may be used without change and may be used in the form of a capsule to prevent the PCM 11 in a liquid state from leaking out of the exterior wall layer 10 in a state changed to a liquid.

According to the present invention, since the interior of the exterior wall layer 10 is filled with the PCM 11 and the heat caused by the solar radiant energy in summer season and during a heat wave is absorbed using the PCM 11, the heat is effectively blocked from being transmitted to an interior of the building wall 1.

Further, since the heat absorbed in the PCM 11 is absorbed using the heating medium flowing through the circulation pipe 60, it is possible to absorb the heat while preventing penetration of the heat. Since the circulation pipe 60 is connected to the seasonal thermal energy storage 50 to enable the heating medium to be circulated, the heat absorbed in the heating medium may be moved to the seasonal thermal energy storage 50 and the heating medium continuously absorbs the heat stored in the PCM 11. The PCM 11 provides the heat to the heating medium while being maintained in the solid state until passing through the latent heat section. However, in consideration of economic efficiency and applicability, it is possible to delay penetration of thermal energy due to external solar heat through the circulation pipe 60 installed in the exterior wall layer 10 without filling the exterior wall layer 10 with the PCM 11. The solar heat penetrating into the exterior wall is transmitted to the circulation pipe 60 in the exterior wall layer 10 due to conduction and convection and the heating medium in the circulation pipe 60 may store heat in the seasonal thermal energy storage 50.

According to the present invention, the exterior wall layer 10 may use a heat storage characteristic of the PCM 11 to block the heat caused by the solar radiant energy from penetrating into the building wall 1. Therefore, it is possible to block the heat from being introduced from the outside, thereby reducing cooling energy.

Generally, the temperature of the building wall 1 rises to 60° C. or higher in summer season or during a heat wave. Even in this case, for a pleasant indoor environment, the indoor temperature of the building may be maintained at 30° C. or lower.

It is advantageous that a PCM having a phase change temperature of 30° C. or lower is used for the exterior wall layer 10. Further, in consideration of a general cooling design temperature of the building, it may be advantageous that a PCM having a phase change temperature of 22° C. to 30° C. is used.

According to the embodiment of the present invention, the PCM may be selected in consideration of the cooling design temperature of the building and it is advantageous that the PCM having the phase change temperature of 22° C. to 30° C. is selected.

When the PCM having the phase change temperature of 22° C. to 30° C. is provided in the exterior wall layer 10, the temperature of the exterior wall layer 10 has a temperature similar to the cooling design temperature of the building. Therefore, the use of the PCM having the phase change temperature of 22° C. to 30° C. is more advantageous in reducing cooling energy consumption in the building.

The PCM 11 includes phase change materials of organic compound series, such as coconut oil (having a phase change temperature of about 24° C.), paraffin (having a phase change temperature of about 53° C.), and n-octadecane. According to the present invention, PCMs of various materials may be used.

According to the embodiment of the present invention, the PCM 11 may include n-octadecane.

Table 1 below is a table showing chemical properties of known PCM products. N-octadecane, which is a PCM whose product name is PARAFOL 18-97, is known to have a phase change temperature of 28° C.

TABLE 1

| Property | Product name | | | |
|---|---|---|---|---|
| | PARAFOL 17-97 | PARAFOL 18-97 | PARAFOL 20Z | NACOL 22-98 |
| Molecular formula | $CH_3(CH_2)_{15}CH_3$ | $CH_3(CH_2)_{16}CH_3$ | $CH_3(CH_2)_{18}CH_3$ | $CH_3(CH_2)_{21}OH$ |
| Phase change temperature | 22° C. | 28° C. | 35° C. | 70° C. |
| Molecular weight | 240 g/mol | 254 g/mol | 282 g/mol | 326 g/mol |
| Typical latent heat capacity | 200 kJ/kg | 254 kJ/kg | 208 kJ/kg | 260 kJ/kg |
| Specific heat | 2 kJ/kg | 2 kJ/kg | 2 kJ/kg | 2 kJ/kg |

TABLE 1-continued

| Property | Product name | | | |
|---|---|---|---|---|
| | PARAFOL 17-97 | PARAFOL 18-97 | PARAFOL 20Z | NACOL 22-98 |
| capacity | | | | |
| Density solid at 15° C. | 0.88 g/cm$^3$ | 0.88 g/cm$^3$ | 0.88 g/cm$^3$ | 0.88 g/cm$^3$ |
| Density liquid at 25° C. | 0.77 g/cm$^3$ | 0.77 g/cm$^3$ | 0.77 g/cm$^3$ | 0.77 g/cm$^3$ |
| Heat conductivity | 0.2 W/m · K | 0.2 W/m · K | 0.2 W/m · K | 0.2 W/m · K |
| Volume expansion | 12.5% | 12.5% | 12% | 12.5% |
| Flash point | 150° C. | 165° C. | 177° C. | 227° C. |
| Boiling point | 302° C. | 317° C. | 343° C. | 180° C. |
| Packing unit | 155 kg/Dm | 155 kg/Dm | 155 kg/Dm | 20 kg/Bg |

According to the embodiment of the present invention, the exterior wall layer 10 may be manufactured in the form of a unit panel and constructed to form an exterior of the building wall 1. Referring to FIG. 1, the exterior wall layer 10 is attached to the concrete layer 20 of the building wall 1. When the exterior wall layer 10 is manufactured in the form of the unit panel, the exterior wall layer 10 may have a case having a substantially hexahedral shape. Unit pipes forming the circulation pipe 60 are disposed inside the exterior wall layer 10, and a space from an inner side of the case to outer sides of the unit pipes filled with the PCM 11. A pipe accommodating groove for arrangement of the unit pipes may be formed inside the case.

When the exterior wall layer 10 is constructed to form the exterior of the building wall 1 by combining unit panels, the unit pipes may be connected to each other to form the circulation pipe 60.

The building system for reducing energy consumption according to the present invention includes the seasonal thermal energy storage 50 in order to store the heat of the heating medium which has absorbed the heat while flowing through the interior of the circulation pipe 60.

The seasonal thermal energy storage 50 is a storage for storing heat in summer season when an amount of solar radiant energy is large and using the stored heat in winter season, and various types of seasonal thermal energy storage 50 are known. The seasonal thermal energy storage 50 is a storage for storing heat caused by the sun in summer season and using the heat in winter season, and the seasonal thermal energy storage 50 is generally referred to as a device for storing the solar heat despite various storage methods being used.

The seasonal thermal energy storage 50 is installed as a heat storage tank installed underground or on the ground. Further, the seasonal thermal energy storage 50 is installed in a pit thermal energy storage method, which is a method of filling an artificial or natural pool with a thermal storage material, or is provided in a borehole thermal energy storage method, which is a method in which a U-shaped tube such as a geothermal heat pump is inserted into a vertical borehole and heat is directly stored in the soil that is saturated with moisture. However, the present invention is not necessarily limited thereto, and the seasonal thermal energy storage 50 having various heat storage methods may be employed.

According to the embodiment of the present invention, water may be used as a heating medium for absorbing thermal energy from the exterior wall layer 10 while flowing through the circulation pipe 60.

The seasonal thermal energy storage 50 may store the heat in the form accommodating the water heated by absorbing the heat while moving in the exterior wall layer 10 along the circulation pipe 60. To this end, according to the embodiment of the present invention, the seasonal thermal energy storage 50 may be formed as a heat storage tank installed underground. The water used as the heating medium absorbs the thermal energy stored in the PCM 11 of the exterior wall layer 10 using a heat exchange method so that the heat is stored in the seasonal thermal energy storage 50 which is a thermal energy storage unit.

The circulation pipe 60 extends to the outside of the exterior wall layer 10 and is connected to the seasonal thermal energy storage 50 so as to enable circulation of the heating medium. Therefore, the heating medium discharged from the seasonal thermal energy storage 50 absorbs the heat while flowing through the exterior wall layer 10 and then returns to the seasonal thermal energy storage 50. In this way, the solar heat is stored in the seasonal thermal energy storage 50. A circulation pump 52 is installed on the circulation pipe 60 disposed between the exterior wall layer 10 and the seasonal thermal energy storage 50. The water stored in the seasonal thermal energy storage 50 flows through the circulation pipe 60 due to the circulation pump 52.

In order to control the flow of the water through the circulation pipe 60, the building system for reducing energy consumption according to the present invention may further include a temperature sensor (not illustrated). A control unit may control the flow and a flow rate of the water through the circulation pipe 60 using a sensed value of the temperature sensor measured at the outside of the building.

The temperature sensor may be disposed inside the exterior wall layer 10. When the interior of the exterior wall layer 10 is filled with the PCM 11, the control unit may determine an operating time of the circulation pump 52 and the flow rate of the water using the sensed value of the temperature sensor which is installed inside the exterior wall layer 10.

When the circulation pump 52 is operated, the water is heated while being circulated to the interior of the exterior wall layer 10 along the circulation pipe 60. The heat stored in the PCM 11 heats the water passing through the interior of the circulation pipe 60 through the circulation pipe 60 in a heat conduction manner and the heated water is moved to the seasonal thermal energy storage 50.

The building system for reducing energy consumption according to the present invention is configured to supply the heat stored in the seasonal thermal energy storage 50 to an energy demand unit 80 that consumes energy in the building in winter season.

Referring to FIG. 4, the energy demand unit 80 may include an indoor heating unit 81 for heating the interior of the building, an interior wall heating unit 82 for increasing a temperature of the building wall, and a ventilation heating unit 83 for ventilation of indoor air.

The indoor heating unit 81 may be a floor heating unit that uses a hot water coil disposed in a floor surface of the interior of the building. A method of heating a floor surface using a hot water coil is generally referred to as ondol heating, and heat is provided to an interior of the building as a method of heating the floor surface by allowing hot water to flow through the hot water coil buried in the floor surface. The hot water coil constitutes a portion of a hot water pipe 70 to be described below. When the indoor heating unit 81 is a floor heating unit that heats the floor surface, the floor surface and the interior wall of the building together with the interior wall heating unit 82 to be described below may be simultaneously heated, and thus additional heating energy consumption in the building may be minimized. Further, it is advantageous to install a fan coil unit using a separate thermal energy source in the building for indoor heating. However, the indoor heating unit 81 may be a fan coil unit. The fan coil unit may be installed inside the building that requires heating and may provide heat in a method of heating the air in the building using hot water passing through the fan coil unit.

The interior wall heating unit 82 includes the heat radiation layer 40 provided on an inner side of the building wall 1. The heat radiation layer 40 is configured to discharge the heat to the interior of the building while the hot water passes through a pipe disposed therein. A pipe provided in the heat radiation layer 40 constitutes a portion of the hot water pipe 70. The heat radiation layer 40 may block the heat from leaking from the interior of the building to the outside through the building wall 1 to improve thermal insulation performance of the building wall 1 and may serve to heat the air in the building.

The ventilation heating unit 83 is configured to heat the cold outdoor air introduced from the outside during ventilation. The ventilation heating unit 83 includes a total heat exchanger 84. The total heat exchanger 84 allows the outdoor air introduced from the outside to be introduced into the building through the heat exchange with the hot water in a state in which the temperature is increased. In the total heat exchanger 84, a pipe through which the hot water passes and a pipe through which the outdoor air passes are formed to be heat-exchangeable, and the pipe through which the hot water passes constitutes a portion of the hot water pipe 70. The pipe through which the hot water passes is referred to as a heating unit in terms of increasing the temperature of the outdoor air introduced into the building and introducing the outdoor air. The ventilation heating unit 83 may be operated in a ventilation mode, in which the indoor air is discharged to the outside and the outdoor air is introduced into the inside, and such a ventilation mode may be a mode for improving quality of the air in the building.

Further, according to the embodiment of the present invention, the energy demand unit 80 may include a hot water supply unit for the use of hot water. The hot water supply unit may supply hot water by heating water through heat exchange with hot water supplied through the hot water pipe connected to the thermal energy storage.

The building system for reducing energy consumption according to the present invention includes the hot water pipe 70 to supply the heat stored in the seasonal thermal energy storage 50 to the energy demand unit 80.

The hot water pipe 70 connects the seasonal thermal energy storage 50 to the indoor heating unit 81, the interior wall heating unit 82, and the ventilation heating unit 83 of the energy demand unit 80.

The hot water pipe 70 supplies the thermal energy stored in the seasonal thermal energy storage 50 to the energy demand unit 80 in the form of hot water.

When the heating medium stored in the seasonal thermal energy storage 50 is hot water, the hot water stored in the seasonal thermal energy storage 50 is directly supplied through the hot water pipe 70 and the hot water that has discharged the heat while passing through the energy demand unit 80 returns to the seasonal thermal energy storage 50.

The hot water pipe 70 is connected to the seasonal thermal energy storage 50 and includes the circulation pump 52 to control the circulation of the hot water through the hot water pipe 70.

According to the embodiment of the present invention, a control valve 51 is provided on the circulation pipe 60 connected between the seasonal thermal energy storage 50 and the exterior wall layer 10, and the hot water pipe 70 may be connected to the seasonal thermal energy storage 50 in a method in which the hot water pipe 70 is coupled to the control valve 51.

The circulation pump 52 is connected to the circulation pipe 60 between the control valve 51 and the seasonal thermal energy storage 50. In summer season when heat is stored by controlling a flow path by the control valve 51, the water is controlled to flow through the circulation pipe. Further, in winter season when heat of the seasonal thermal energy storage 50 is used by controlling the flow path by the control valve 51, that is, when the heat is radiated, the water is controlled to flow through the hot water pipe. The pipe disposed between the seasonal thermal energy storage 50 and the control valve 51 is the circulation pipe 60 and, at the same time, constitutes a portion of the hot water pipe 70. Through such arrangement of the pipes, a system configuration of the building system for reducing energy consumption according to the present invention may be simplified and the ease of control may be secured.

According to the present invention, the hot water pipe 70 is disposed so that the hot water sequentially passes through the indoor heating unit 81, the interior wall heating unit 82, and the ventilation heating unit 83. When the energy demand unit 80 includes some of the indoor heating unit 81, the interior wall heating unit 82, and the ventilation heating unit 83, the order in which the hot water passes is constant except for the excluded units. That is, the energy demand unit 80 may include at least two of the indoor heating unit 81, the interior wall heating unit 82, and the ventilation heating unit 83, and the hot water pipe 70 sequentially passes through at least two of the indoor heating unit 81, the interior wall heating unit 82, and the ventilation heating unit 83. Such an arrangement is advantageous for increasing energy consumption efficiency in terms of heating efficiency.

According to the embodiment of the present invention, a heat pump 90 for increasing the temperature of the hot water before the hot water is moved to the upstream side of the hot water pipe 70, that is, the energy demand unit 80, may be further provided.

A system using the heat stored in the seasonal thermal energy storage 50 and a heating system using a separate energy source may be integrated in a manner in which the heat pump 90 directly heats the temperature of the hot water discharged from the seasonal thermal energy storage 50. The heat pump 90 may be operated when the temperature of the hot water stored in the seasonal thermal energy storage 50 is lower than a set temperature. The heat pump 90 is operated when it is difficult to handle a heat load for heating only using solar energy stored in the seasonal thermal energy storage 50, and thus heating energy consumption in the entire building can be reduced.

As described above, the energy demand unit 80 uses the thermal energy, which is stored in the seasonal thermal energy storage 50 in summer season, in winter season and may use the thermal energy for floor heating, interior wall heating, and ventilation of indoor air, and thus the heating energy consumption in the building in winter season can be reduced.

Hereinafter, a method of utilizing solar energy using the building system for reducing energy consumption according to the present invention will be described.

[Summer Season]

As illustrated in FIG. 3, in summer season, external heat such as solar radiant energy or the like is provided to the exterior wall layer 10 provided on the building wall 1. The heating medium passing through the circulation pipe 60 disposed inside the exterior wall layer 10, that is, the water, absorbs solar heat incident on the exterior wall layer 10 to block the external heat from being introduced into the building and, at the same time, is moved to the seasonal thermal energy storage 50 to store the solar heat.

Since the PCM 11 with which the interior of the exterior wall layer 10 is filled absorbs and stores the heat, the PCM 11 prevents the solar heat from passing through the building wall 1 and being introduced into the building. Particularly, when the phase change temperature of the PCM 11 is similar to the cooling design temperature of the building, the temperature of the PCM 11 is maintained in a latent heat section having a temperature similar to the cooling design temperature of the building even when the PCM 11 absorbs the heat. When the temperature of the PCM is maintained in the latent heat section, the water flowing through the circulation pipe 60 disposed inside the exterior wall layer 10 absorbs the heat of the PCM and moves the heat to the seasonal thermal energy storage 50 through the circulation pipe 60. The PCM 11 may provide the heat to the heating medium while maintaining a solid state and there is no change in temperature even when the PCM 11 absorbs the heat in the latent heat section, and thus it is possible to suppress a change in temperature of the interior of the building even when an ambient temperature is changed. That is, the exterior wall layer 10 provided with the PCM 11 may perform an insulating function for blocking solar radiant energy from being introduced into the building, thereby suppressing a change in temperature of the interior of the building. However, in consideration of economic efficiency and applicability, it is possible to delay penetration of thermal energy due to external solar heat through the circulation pipe 60 installed in the exterior wall layer 10 without filling the exterior wall layer 10 with the PCM 11. The solar heat penetrating into the exterior wall is transmitted to the circulation pipe 60 in the exterior wall layer 10 due to conduction and convection and the heating medium in the circulation pipe 60 may store heat in the seasonal thermal energy storage 50.

As described above, the introduction of the heat into the building through the building wall 1 is blocked, and thus it is possible to reduce cooling energy used for cooling the interior of the building and to maintain a pleasant indoor environment.

The solar heat absorbed by the water flowing through the circulation pipe 60 is moved and stored in the seasonal thermal energy storage 50.

In summer season, the control valve 51 controls the water to flow between the seasonal thermal energy storage 50 and the circulation pipe 60 and blocks the movement of the water through the hot water pipe 70.

[Winter Season]

As illustrated in FIG. 4, in winter season, the thermal energy which is stored in the seasonal thermal energy storage 50 in summer season is used for heating.

In this case, the control valve 51 controls the water to flow between the seasonal thermal energy storage 50 and the hot water pipe 70 and blocks the movement of the water through the circulation pipe 60. Therefore, in the winter season, the heat is not stored in the seasonal thermal energy storage 50 and the heat is radiated. Since the flow of the water between the seasonal thermal energy storage 50 and the hot water pipe 70 is a process of transmitting the solar heat stored in the seasonal thermal energy storage 50 to the outside, the flow of the water corresponds to the heat radiation of the seasonal thermal energy storage 50.

The hot water pipe 70 is disposed to sequentially pass through the indoor heating unit 81, the interior wall heating unit 82, and the ventilation heating unit 83, and the hot water discharged from the seasonal thermal energy storage 50 discharges the heat while flowing through the hot water pipe 70.

The hot water may be supplied to the floor heating unit, which is the indoor heating unit 81, through the hot water pipe 70 to perform floor heating.

The hot water passing through the indoor heating unit 81 performs heating on the building wall while flowing through an interior of the heat radiation layer 40 constituting the interior wall heating unit 82 through the hot water pipe 70.

The hot water passing through the interior wall heating unit 82 is introduced into the total heat exchanger 84 of the ventilation heating unit 83. When the ventilation heating unit 83 is operated in the ventilation mode, the hot water introduced into the total heat exchanger 84 allows the outdoor air to be introduced into the building in a state in which the temperature of the outdoor air is increased through heat exchange with the outdoor air introduced from the outside.

The hot water passing through the ventilation heating unit 83 returns to the seasonal thermal energy storage 50 through the hot water pipe.

During the winter season, by enabling heating and ventilation of the building using the thermal energy stored in the seasonal thermal energy storage 50, the heating energy consumption due to a boiler or the like can be reduced and a pleasant indoor environment can be maintained.

According to the building system for reducing energy consumption according to the present invention, in summer season when an amount of solar radiant energy is large, particularly, during a heat wave, by reducing thermal energy transmitted to an interior of a building using a heating medium circulating along a circulation pipe, it is possible to reduce cooling energy consumption in the building.

Particularly, when an exterior wall layer filled with a PCM is provided on an exterior wall of the building and the circulation pipe is configured so that the heating medium absorbs the thermal energy while passing through an interior of the circulation pipe, the PCM in a solid state absorbs heat to block the heat from penetrating into the building and the heating medium absorbs the heat stored in the PCM, and thus it is possible to effectively prevent the heat from being transmitted to the interior of the building. Furthermore, when the PCM has a phase change temperature similar to a design temperature of the interior of the building, a temperature of the exterior wall layer is maintained at a temperature similar to the design temperature of the interior of the building and the transmission of the heat is blocked, and thus it is possible to more effectively suppress an increase in temperature of the interior of the building through the building wall.

Accordingly, by effectively preventing external heat from being transmitted to the interior of the building in summer season, it is possible to suppress an increase in temperature of the interior of the building through the building wall. Accordingly, it is possible to reduce cooling energy consumption and to maintain a pleasant indoor environment.

Further, solar heat absorbed in summer season can be stored in a seasonal thermal energy storage and the solar heat stored in the seasonal thermal energy storage can be used for heating of the building in winter season. Accordingly, it is possible to reduce cooling energy consumption in the building.

The above description of the invention is only exemplary and it will be understood by those skilled in the art that various modifications can be made without departing from the scope of the present invention and without changing essential features. Therefore, the above-described embodiments should be considered in a descriptive sense only and not for purposes of limitation. The scope of the present invention is defined not by the detailed description but by the appended claims and encompasses all modifications or alterations derived from meanings, the scope and equivalents of the appended claims.

What is claimed is:

1. A building system for reducing energy consumption, the building system comprising:
    a building wall in which an exterior wall layer, a concrete layer, an insulator, and a heat radiation layer are sequentially arranged inward from an outer side of a building, wherein the exterior wall layer accommodates a phase change material (PCM), the PCM absorbs heat in a latent heat section while maintaining a state without a temperature change, and when the PCM absorbs heat, there is no change in temperature within the latent heat section, thereby performing an insulation function that blocks solar radiant heat from passing through the building wall into the building interior;
    a circulation pipe penetrating an interior of the exterior wall and through which a heating medium flows, wherein the heating medium circulates in the circulation pipe and exchanges heat with the PCM in the exterior wall layer, and the PCM provides the heat to the heating medium while maintaining the state without a temperature change due to heat being absorbed in the PCM using the heating medium that flows through the circulation pipe;
    a thermal energy storage, the thermal energy storage being a seasonal thermal energy storage connected to the circulation pipe and configured to store heat transmitted by the heating medium in a summer season, wherein the thermal energy storage stores solar heat absorbed during the summer season, and the stored heat is utilized by the energy demand unit during the winter season for heating purposes;
    a hot water pipe, one side of which is connected to the thermal energy storage and penetrates an interior of the heat radiation layer;
    an energy demand unit connected to the thermal energy storage through the hot water pipe and receiving thermal energy stored in the thermal energy storage during the summer season as a heated heating medium, and during the winter season, utilizing the heating medium for hot water and a heat source;
    a control valve configured to control a flow direction of the heating medium, wherein during the summer season, the control valve directs the heating medium to circulate through the circulation pipe to store solar heat absorbed by the exterior wall layer in the thermal energy storage while transferring heat from the PCM to the thermal energy storage, thereby maintaining the PCM in the state without a temperature change, and during the winter season, the control valve redirects the heating medium to circulate through the hot water pipe, thereby supplying the stored thermal energy to the energy demand unit and the heat radiation layer for heating purposes while preventing the heating medium from circulating though the circulation pipe, thereby preventing heat exchange with the PCM in the exterior wall; and
    a circulation pump connected to the thermal energy storage and forcing the heating medium to circulate.

2. The building system of claim 1, wherein the PCM is a PCM having a phase change temperature of 22° C. to 30° C.

3. The building system of claim 1, wherein the PCM is any one of coconut oil, paraffin, and n-octadecane.

4. The building system of claim 1,
    wherein the energy demand unit includes at least one of an indoor heating unit which heats a floor surface or air inside the building, an interior wall heating unit which heats an interior wall of the building, a ventilation heating unit which heats outdoor air introduced into the building and a hot water supply unit which heats water to supply the hot water, and
    the hot water pipe passes through the energy demand unit to provide the heat.

5. The building system of claim 4, wherein the interior wall heating unit is formed as a heat radiation layer that forms an interior wall of the building walls and has an interior through which the hot water pipe passes.

6. The building system of claim 1, wherein a heat pump configured to increase a temperature of water flowing through the hot water pipe is installed in the hot water pipe.

* * * * *